(12) United States Patent
Morita et al.

(10) Patent No.: US 7,632,422 B2
(45) Date of Patent: Dec. 15, 2009

(54) HEAT TRANSPORT MEDIUM

(75) Inventors: Yoshiyuki Morita, Saitama (JP); Ayako Omori, Saitama (JP); Masanori Tomita, Tokyo (JP); Masaru Ishibashi, Tokyo (JP); Takashi Yanagisawa, Tokyo (JP)

(73) Assignees: Honda Motor Co., Ltd., Tokyo (JP); GSI Creos Corporation, Tokyo (JP)

( * ) Notice: Subject to any disclaimer, the term of this patent is extended or adjusted under 35 U.S.C. 154(b) by 0 days.

(21) Appl. No.: 12/032,257

(22) Filed: Feb. 15, 2008

(65) Prior Publication Data
US 2008/0197318 A1    Aug. 21, 2008

(30) Foreign Application Priority Data
Feb. 16, 2007    (JP) .............................. 2007-036376

(51) Int. Cl.
*C09K 5/00*    (2006.01)
*C09K 5/04*    (2006.01)
(52) U.S. Cl. .............................. 252/73; 252/69; 252/71; 252/74; 423/447.1; 524/495
(58) Field of Classification Search .................... 252/71, 252/74; 423/447.1; 524/495
See application file for complete search history.

(56) References Cited

U.S. PATENT DOCUMENTS

| 6,280,677 | B1 * | 8/2001 | Yakobson | 264/430 |
| 6,759,653 | B2 * | 7/2004 | Nakayama et al. | 850/58 |
| 6,783,746 | B1 * | 8/2004 | Zhang et al. | 423/447.1 |
| 6,858,157 | B2 * | 2/2005 | Davidson et al. | 252/70 |
| 7,195,723 | B1 * | 3/2007 | Gurin | 252/519.3 |
| 7,410,597 | B2 * | 8/2008 | Chen | 252/71 |
| 7,411,085 | B2 * | 8/2008 | Hirakata et al. | 560/116 |
| 2002/0027312 | A1 * | 3/2002 | Yakobson | 264/430 |
| 2002/0136881 | A1 * | 9/2002 | Yanagisawa et al. | 428/293.1 |
| 2003/0029996 | A1 * | 2/2003 | Nakayama et al. | 250/306 |
| 2003/0044685 | A1 * | 3/2003 | Yanagisawa et al. | 429/231.8 |
| 2004/0067364 | A1 * | 4/2004 | Ishikawa et al. | 428/411.1 |
| 2004/0069454 | A1 * | 4/2004 | Bonsignore et al. | 165/104.15 |
| 2004/0209782 | A1 * | 10/2004 | Zhang et al. | 508/113 |
| 2004/0234841 | A1 * | 11/2004 | Yoshitake et al. | 429/44 |
| 2005/0012069 | A1 * | 1/2005 | Maes et al. | 252/73 |
| 2005/0025694 | A1 * | 2/2005 | Zhang et al. | 423/447.1 |
| 2005/0269548 | A1 * | 12/2005 | Jeffcoate et al. | 252/71 |

(Continued)

FOREIGN PATENT DOCUMENTS

JP    2003-95624 A    4/2003

(Continued)

OTHER PUBLICATIONS

Derwent abstract JP 2006-083228A Hayama et al. 2006.*

(Continued)

*Primary Examiner*—Mark Eashoo
*Assistant Examiner*—Jane L Stanley
(74) *Attorney, Agent, or Firm*—Westerman, Hattori, Daniels & Adrian, LLP

(57) ABSTRACT

Carbon nanotubes, which carry surface functional groups on side walls thereof relative to lengths thereof, and a dispersant are added to a base liquid to provide a heat transport medium capable of achieving high heat conductivity while suppressing an increase in kinetic viscosity.

4 Claims, 7 Drawing Sheets

U.S. PATENT DOCUMENTS

| | | | |
|---|---|---|---|
| 2006/0017191 A1* | 1/2006 | Liang et al. | 264/140 |
| 2006/0228287 A1* | 10/2006 | Zettl et al. | 423/447.1 |
| 2006/0257637 A1* | 11/2006 | Pereira et al. | 428/221 |
| 2007/0078215 A1* | 4/2007 | Yoon et al. | 524/495 |
| 2007/0120094 A1* | 5/2007 | Yang et al. | 252/389.2 |
| 2007/0158609 A1* | 7/2007 | Hong et al. | 252/71 |
| 2008/0011978 A1* | 1/2008 | Kawaguchi et al. | 252/69 |
| 2008/0302998 A1* | 12/2008 | Hong et al. | 252/74 |

FOREIGN PATENT DOCUMENTS

| | | | |
|---|---|---|---|
| JP | 2003-300715 A | | 10/2003 |
| JP | 2003-300716 A | | 10/2003 |
| JP | 2004-168570 A | | 6/2004 |
| JP | 2004-216516 A | | 8/2004 |
| JP | 2004-261713 A | | 9/2004 |
| JP | 2006-083228 A | * | 3/2006 |
| JP | 2006-291002 A | * | 10/2006 |
| JP | 2006291002 A | * | 10/2006 |
| JP | 2007-031520 A | * | 2/2007 |
| WO | WO 2008/004347 A1 | * | 1/2008 |

OTHER PUBLICATIONS

Machine translation of JP 2006-083228A Hayama et al. 2006.*
Derwent abstract JP 2006-291002 A Morita et al. 2006.*
Machine translation JP 2006-291002 A Morita et al. 2006.*
Derwent abstract JP 2007-031520 A Morita et al. 2007.*
Machine translation JP 2007-031520 A Morita et al. 2007.*
Minami et al. "Cellulose derivatives as excellent dispersants for single-wall carbon nanotubes as demonstrated by absorption and photoluminescence spectroscopy" Applied Physics Letters, 88, 093123 (2006).*
Nanotube 2006, 7th International Conference on The Science and Application of Nanotubes, Jun. 2006, Contribution C.023 "Introduction of COOH on MWCNT by Friedel-Crafts acylation", Arai et al., p. 157 and Contribution C.026 "Introduction of COOH on MWCNT by ligand exchange reaction", Takahashi et al., p. 160.*
Derwent abstracts JP 2006291002 A, publication date Oct. 2006, Morita et al.*
Derwent abstracts WO 2008/004347 A1, publication date Jan. 2008, Fukuzumi et al.*
S. Lee, S. U.-S. Choi; S. Li, and J.A. Eastman; Measuring Thermal Conductivity of Fluids Containing Oxide Nanoparticles; published in Journal of Heat Transfer; p. 280-289; vol. 121; May 1999.

* cited by examiner (c)

(d)

HEAT TRANSPORT MEDIUM

TECHNICAL FIELD

This application relates to a heat transport medium to be filled in heat exchangers, and especially to a technology that can provide a base liquid for a heat transport medium, which is represented by water or ethylene glycol, with a significantly-improved heat conductivity without an increase in the kinetic viscosity of the base liquid by stably dispersing carbon nanotubes in the base liquid.

BACKGROUND OF THE INVENTION

In a method for improving the heat conductivity of heat transport medium, it is known to mix liquid with metal system nanometric particles whose diameter is on a nanometer order. See J. Heat Transfer 121, pp. 280-289 (1999). For a liquid including metal system nanometric particles, metal oxides which are added to a base liquid include, for example, $Al_2O_3$, $CuO$, $TiO_2$, $Fe_2O_3$, whose diameter is less than or equal to 100 nm. Further, an interfacial active agent is used; for example dodecyl sodium sulfate, sodium polyacrylate, to keep dispersal stable.

However, metal system nanometric particles of 1-10 wt % relative to the heat transport medium need to be added to improve the heat conductivity of liquid, and adding a large amount of metal system nanometric particles increases the kinetic viscosity of the liquid severely. The increase of the kinetic viscosity of the liquid increases the energy consumption of the pump to circulate the fluid, and an increase in friction resistance occurs. Therefore, this increase causes some problems, for example, heat exchange efficiency and the amount of heat release decrease, thus preventing the improvement of heat conductivity.

Another liquid is known. It comprises solubilized carbon nanotubes in a base liquid, instead of metal system nanometric particles. In detail, in this technology, carbon nanotubes are solubilized in a base liquid by acid treatment on the surface of carbon nanotubes. See Japanese Patent Application Publications JP2003-95624, JP2003-300715, JP2003-300716, JP2004-168570 and JP2004-216516.

However, under this technology, adding a small amount of carbon nanotubes into the base liquid causes a decrease in pH to 5-6 because of the acid treatment on the surface of carbon nanotubes. Therefore, the liquid is a corrosive and there is a problem that it is necessary to provide or maintain acid-resistance for the system with the heat transport medium.

Another liquid is also known. Solubilization technology of carbon nanotubes by a basic polymer comprising an amino base or a fluorine polymer as dispersant is shown. See Japanese Patent Application Publication JP2004-261713.

However, this heat transport medium also comprises general anti-corrosion material to prevent corrosion of metal pipework parts making up the flow passage. Therefore, there is a possibility that the dispersant and anti-corrosion material react chemically and cause problems, for example deposition, decomposition, transmutation and formation of a supernatant. Further, these polymers have poor heat resistance in view of the application for heat transport medium because they can decompose or burn under 200° C.

SUMMARY OF THE INVENTION

An object of the present invention is, therefore, to improve the dispersibility of carbon nanotubes, and hence, to provide a heat transport medium capable of providing an improved heat conductivity while suppressing an increase in kinetic viscosity.

The heat transport medium according to the present invention has been developed based on the above-described finding, and is characterized by the addition of carbon nanotubes, which carry surface functional groups on their side walls relative to their lengths, and a dispersant into the base liquid. Incidentally, the surface functional group in the present invention includes hydrogen, hydroxyl, carboxyl, methyl, and methylene.

In the present invention, the carbon nanotubes are provided with self-dispersibility due to surface charges derived from their surface functional groups, and therefore, are excellent in their dispersibility in the base liquid. Accordingly, the carbon nanotubes can provide the base liquid with improved heat conductivity without a significant increase in kinetic viscosity. As a consequence, efficient exchange and transport of heat is feasible with the heat transport medium according to the present invention.

BRIEF DESCRIPTION OF THE DRAWINGS

The advantages of the invention will become apparent in the following description taken in conjunction with the drawings, wherein.

DETAILED DESCRIPTION OF THE INVENTION

In the following paragraphs, some preferred embodiments of the invention will be described by way of example and not limitation. It should be understood based on this disclosure that various other modifications can be made by those in the art based on these illustrated embodiments.

In this invention, the heat transport medium comprises a base liquid, carbon nanotubes, and finite dispersant. The details of each element are as follows.

In this invention, $H_2O$; alcohols, for example methanol, ethanol, propanol, butanol, pentanol, hexanol and heptanol; glycols, for example ethylene glycol and propylene glycol; and mixture of these can be used as the base liquid.

Figure 1A:
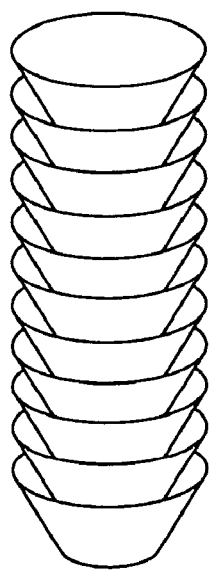
FIGS. 1A to 1D are schematic drawings illustrating one example of carbon nanotubes in the present invention.
Figure 1B:
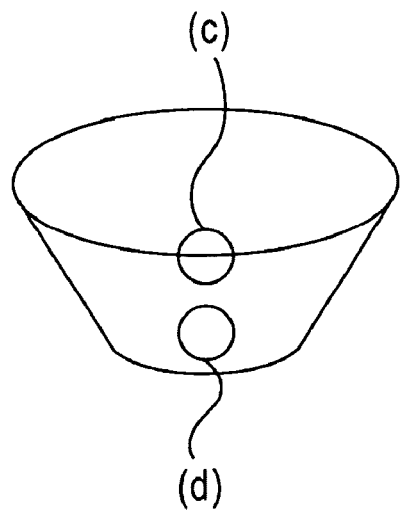
Figure 1C:
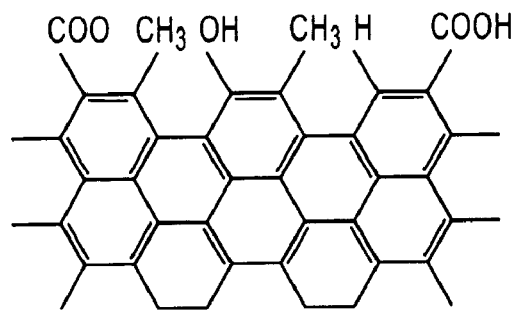
Figure 1D:
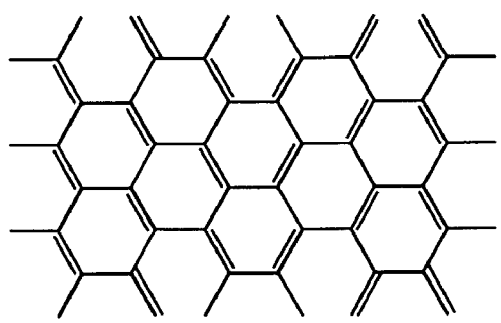

It is essential for the carbon nanotubes in the present invention to carry surface functional groups on their side walls relative to their lengths. Examples of such specific carbon nanotubes can include cup stack carbon nanotubes ("CARBERE", trademark; product of GSI Creos Corporation). These are a sort of carbon nanotubes which can be obtained by subjecting a hydrocarbon to vapor-phase growth while using ultrafine particles of a metal catalyst as nuclei. Unlike general carbon nanotubes which are formed of concentric graphite layers, the present invention may use cup stack carbon nanotubes, as illustrated in FIG. 1A. An individual layer one of these cup stack carbon nanotubes is illustrated in FIG. 1B. It is to be noted that each cup-shaped graphite layer shown in FIG. 1B is not limited to a layer having an opening in its bottom portion, but can also be a layer which is closed at its bottom portion. Each cup-shaped graphite layer carries surface functional groups on a circumferential top edge portion thereof as depicted in FIG. 1C. However, on a conical side wall thereof, a graphite layer free of surface functional groups is formed, as shown in FIG. 1D. When stacked into the construction illustrated in FIG. 1A, the entire surface area of the resulting stack corresponds to the edge portions of a stacked graphite structure, and therefore, the cup-stack CNTs have a similar function as "normal" non-cup-stacked CNTs, except for the fact that "normal" CNTs have chemical modifications on the surface and the cup-stacked CNTs do not. In other words, in cup-stacked CNTs, the edges give stability to allow for dispersion of the CNTs in the base liquid, while in "normal" CNTs, the chemical modifications on the surface give stability to allow for dispersion of the CNTs. Accordingly, the cup stack carbon nanotubes are equipped with advantages such that they are readily dispersible in the base liquid and are resistant to aggregation due to weak charges resulting from their surface functional groups. It is to be noted that the cup stack carbon nanotubes may be chemically modified at the surfaces thereof to provide them with further improved dispersibility in the base liquid.

In each general carbon nanotube formed of concentric graphite layers, on the other hand, functional groups on only end portions of the respective graphite layers are exposed at the end portions of the nanotube. Since the side wall of each nanotubes has a graphite structure which is chemically inert, such general carbon nanotubes require localized functionalization by strong-acid treatment, polymer wrapping or the like at their side walls to be dispersed in the base liquid.

Figure 2A:
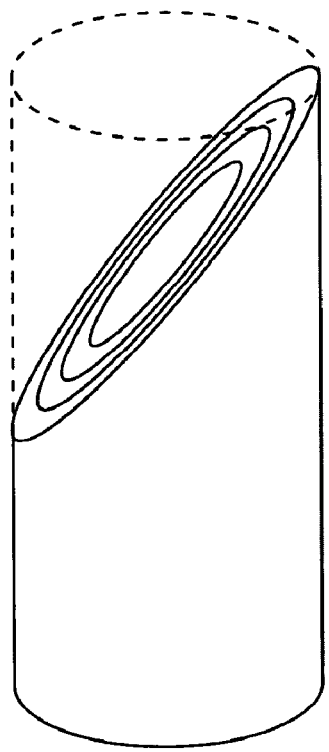
FIGS. 2A and 2B are schematic drawings depicting another example of carbon nanotubes in the present invention.
Figure 2B:
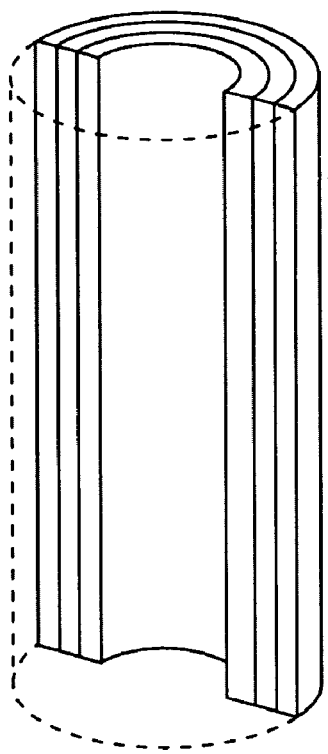

Further, the specific carbon nanotubes in the present invention can also be carbon nanotubes obtained by cutting obliquely, as depicted in FIG. 2A, or carbon nanotubes obtained by axially cutting general cylindrical carbon nanotubes as shown in FIG. 2B. According to such a construction, surface functional groups can be carried on the portions corresponding to the cut surfaces, so that like the above-described cup stack carbon nanotubes, these carbon nanotubes can be provided with improved dispersibility in the base liquid. It is to be noted that these carbon nanotubes may be chemically modified at their surfaces to provide them with further improved dispersibility in the base liquid.

Examples of the dispersant in the present invention can include dextrin, cyclodextrin; cellulose ethers such as methylcellulose, ethylcellulose, hydroxyethylcellulose, hydroxypropylcellulose, hydroxypropylmethylcellulose, hydroxypropylmethylcellulose phthalate, and carboxymethylcellulose; and cellulose esters such as cellulose acetate phthalate; cellulose ether esters, methoxylated pectin, carboxymethylated starch, and chitosan. Among these, carboxymethylcellulose is preferred, with its sodium salt being more preferred. Further, the dispersant for use in the present invention may preferably have a heat resistance of 250° C. or higher.

In the present invention, the content of the specific carbon nanotubes can be, for example, from 0.1 to 15 wt %, preferably from 0.1 to 10 wt %. To bring about the effect of improving the heat conductivity and also to prevent an increase in kinetic viscosity, the content of the specific carbon nanotubes may generally be required to be at least 0.1 wt %. On the other hand, an unduly large content of the specific carbon nanotubes leads to an increase in kinetic viscosity, thereby developing undesirable effects. It is, therefore, desired to set the content of the specific carbon nanotubes at 15 wt % or lower. To facilitate the dispersion of these carbon nanotubes, the content of the dispersant may be required to be at least 0.1 wt % in general. On the other hand, an excessively large content of the dispersant leads to an increase in kinetic viscosity, thereby developing undesirable effects. Therefore, the content of the dispersant may preferably be 10 wt % or lower.

The heat transport medium according to the present invention may have preferably a kinetic viscosity of 20 $mm^2$/sec or lower at 25° C. and a kinetic viscosity of 10 $mm^2$/sec or lower at 40° C., more preferably a kinetic viscosity of from 0.9 to 20 $mm^2$/sec at 25° C. and a kinetic viscosity of from 0.5 to 10 $mm^2$/sec at 40° C. When the kinematic viscosities fall within these ranges, it is possible to reduce the energy consumption of a circulating means and also to improve the heat conductivity.

In this invention, the heat transport medium can comprise an anti-corrosion material. This anti-corrosion material can include at least one from the group of phosphoric acid including orthophosphoric acid, pyrophosphoric acid, hexametaphosphoric acid and tripolyphosphoric acid; aliphatic carboxylic acid including at least one from the group of pentane acid, hexane acid, heptane acid, octane acid, nonane acid, decane acid, 2-ethylhexane acid, adipic acid, suberic acid, azelaic acid, sebacic acid, undecanoic acid, and dodecane dioic acid; and aromatic carboxylic acid including at least one from the group of acidum benzoicum, toluic acid, p-t-butyl benzoic acid, phthalic acid, p-methoxybenzoic acid, and cinnamic acid. The salts of these acids can be used, and sodium salt and potassium salts are favorable. Moreover, triazole including at least one from the group of benzotriazole, mer-benzotriazole, cycrobenzotriazole and 4-phenyl-1,2,3-triazole; thiazole, for example mercapto benzothiazole; silicate including at least one from the group of metasilicic acid and liquid glass ($Na_2O/XSiO_3$ X=0.5–3.3); nitrate including at least one from the group of sodium nitrate and potassium nitrate; nitrite including at least one from the group of sodium nitrite and potassium nitrite; borate including at least one from the group of sodium tetraborate and potassium tetraborate; molybdate including at least one from the group of sodium molybdate, potassium molybdate, and ammonium molybdate; amine salt including at least one from the group of monoethanolamin, diethanolamin, triethanolamin, monoisopropanolamin, diisopropanolamin and triisopropanolamin also are used for the anti-corrosion material.

Figure 3:
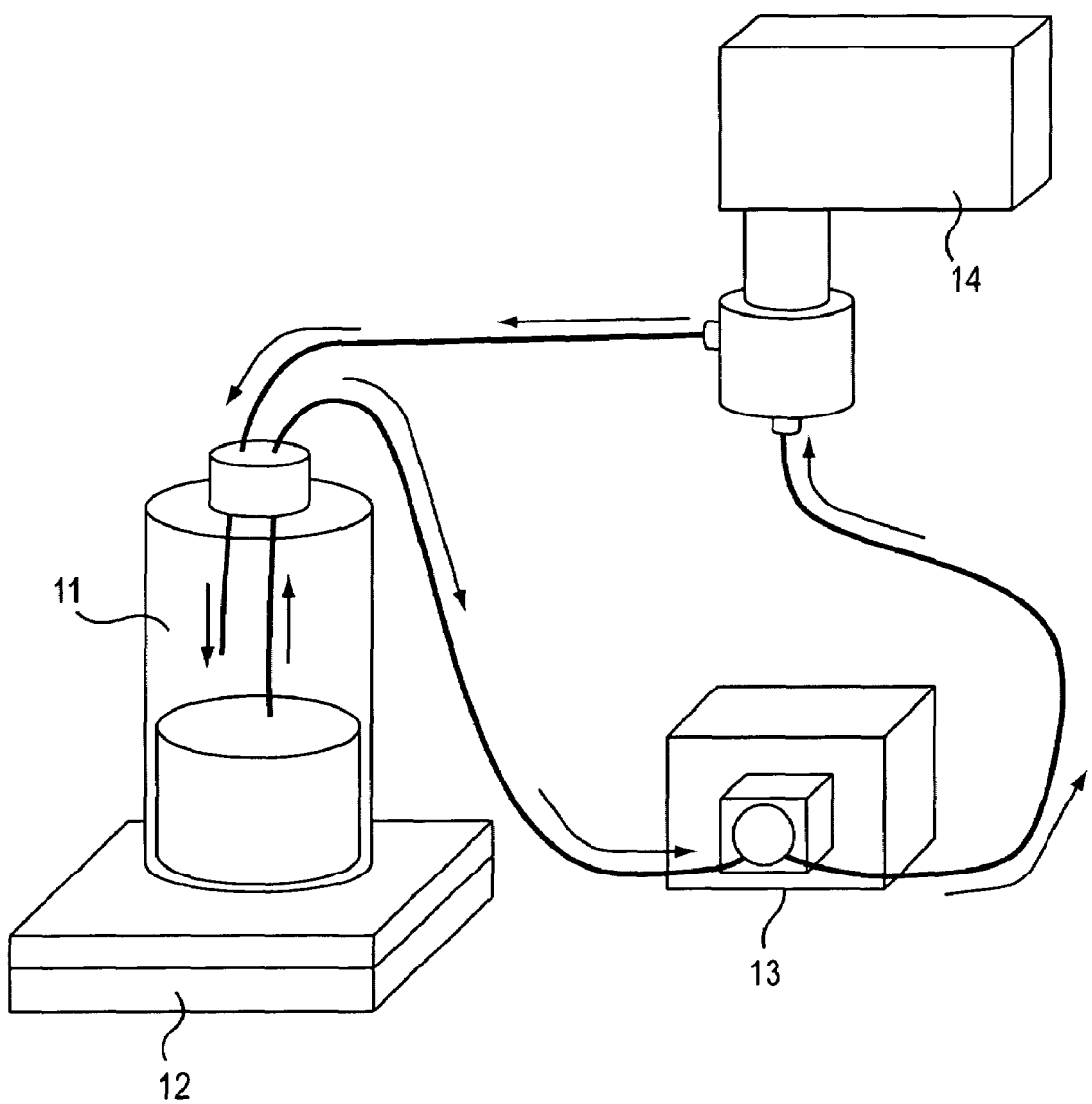
FIG. 3 is a diagram showing a circulating treatment system for producing a heat transport medium in this invention.

The heat transport medium according to the present invention can be produced by dispersing the specific carbon nanotubes in the base liquid by a conventionally-known method, specifically by stirring the base liquid, which contains the specific carbon nanotubes and dispersant added therein, on a magnetic stirrer or the like. However, use of a process to be described below can achieve better dispersion. This production process of the heat transport medium includes the following steps: feeding a portion of the base liquid, which contains the specific carbon nanotubes and dispersant added therein, to the dispersing means; subjecting the thus-fed portion of the base liquid to dispersing processing by the dispersing means; and returning the thus-dispersed base liquid to the undispersed base liquid. By continuously repeating these individual steps, the specific carbon nanotubes can be finely dispersed in the base medium. Specifically, a circulation-type processing system such as that shown in FIG. 3 can be used. The circulation-type processing system of FIG. 3 is constructed of a vial container 11 with the specific carbon nanotubes and the dispersant therein, a magnetic stirrer 12, a tubing pump 13, and an ultrasonic processing system 14 corresponding to the above-mentioned dispersing means. The base liquid is circulated at a predetermined flow rate by the tubing pump 13 through the circulation-type processing system, while being stirred in the vial container 11 by the magnetic stirrer 12. Of the circulating base liquid, the base liquid which is circulating through a peripheral station with the ultrasonic processing system 14 arranged therein is successively exposed to ultrasonic waves from the ultrasonic processing system 14. As a result, the specific carbon nanotubes in the base liquid are finely dispersed.

The heat transport medium can be applied to at least a cooling medium for internal combustion engines, fuel cell unit, computer circuit, central processing unit (CPU), atomic pile and steam-power generation; heat transport medium for cooling and heating system, heat storage system and hot water and boiler system; electrolyte for dye sensitized type solar cell; electrically-conductive coating; electromagnetic wave absorption coating; water repellency coating; and lubricating film coating.

EXAMPLES

Production of Heat Transport Fluid

Example 1

Ultrapure water produced using a pure water production system ("MILLI-Q-LABO", trade name; manufactured by Nihon Millipore K.K.) was weighed and filled as a base liquid in the vial container 11. As shown in Table 1, carboxymethylcellulose sodium ("CMC DICEL", trade name, product of Dicel Chemical Industries, Ltd.; model No.: 1102; average molecular weight: 25,000) was weighed to give 10 wt % and was added to the vial container 11. The resulting fluid was stirred for 60 to 120 minutes by a magnetic stirrer ("CERA-MAG-MIDI", trade name; manufactured by IKA Works U.S.A).

Figure 4:
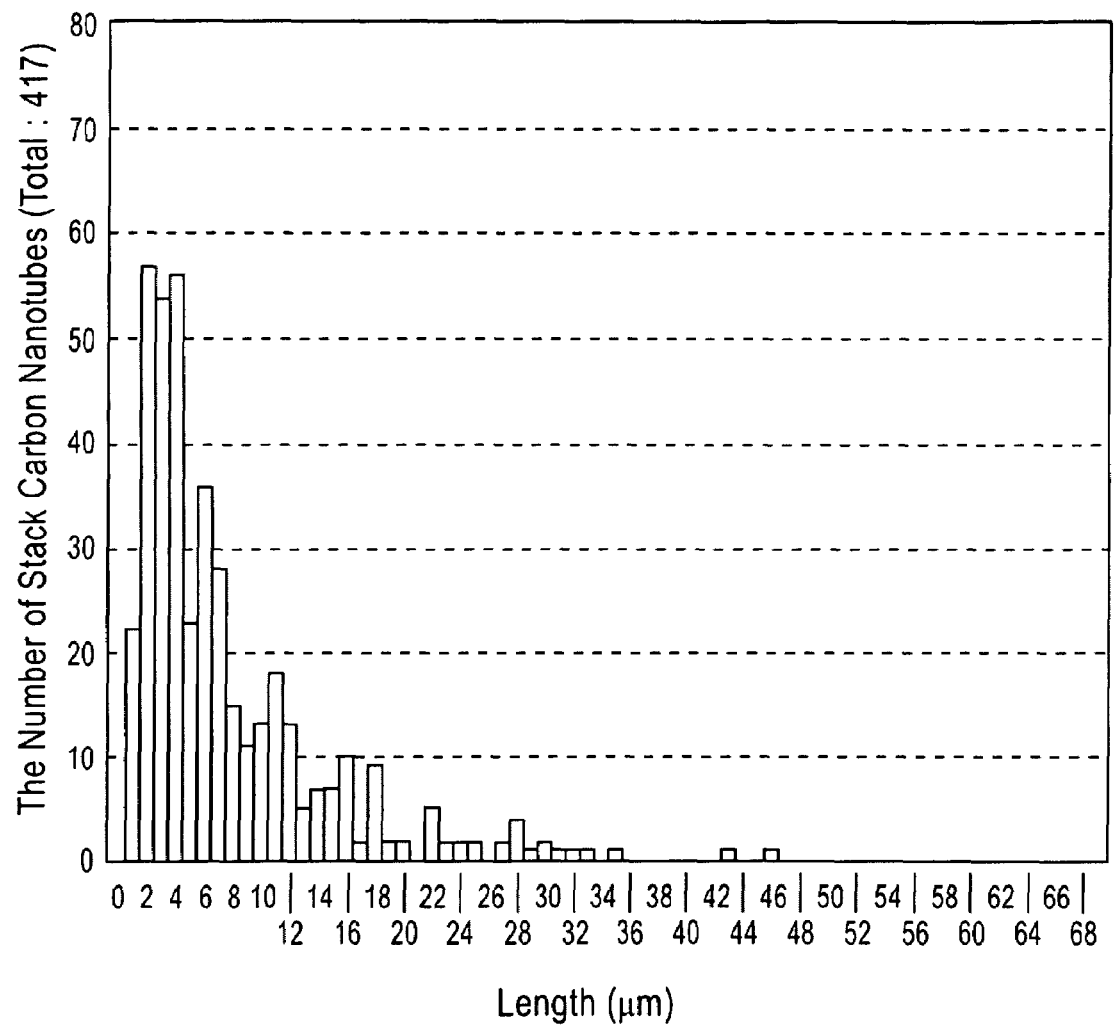
FIG. 4 is a bar graph showing a length distribution of stack carbon nanotubes.

Specific carbon nanotubes ("CARBERE", trade name for cup stack carbon nanotubes, product of GSI Creos Corporation; outer diameter: 100 nm, length: 10 μm) were weighed to give 15 wt % and were added to the fluid in the vial 11. It is to be noted that the above-described cup stack carbon nanotubes had the length distribution shown in FIG. 4, and had a number average length (Ln) of 8.20 μm, a weight average length (Lw) of 14.31 μm and a length distribution (Lw/Ln) of 1.75. As pre-stirring, the resulting fluid composition was stirred around room temperature (approximately 25° C.) at 1,200 rpm for 1 to 2 hours by the magnetic stirrer ("CERAMAG-MIDI", trade name; manufactured by IKA Works U.S.A).

The vial container 11 with the fluid composition contained therein was next connected to the circulation-type processing system illustrated in FIG. 3 and equipped with the ultrasonic processing system 14 ("UP400S UNIT", trade name, power output: 400 W and "G22K FLOW CELL", trade name, both manufactured by Dr. Hielscher GmbH, Germany). While continuing stirring of the fluid composition at 1,200 rpm by the magnetic stirrer ("CERAMAG-MIDI", trade name; manufactured by IKA Works U.S.A) and also circulating the fluid composition at a rate of 300 mL/min by the tubing pump 13 ("CONSOLEDRIVE-7520-40" and "EASYLOAD 7518-00", both trade names; manufactured by MasterFlex AG), the fluid composition was exposed to ultrasonic waves. The circulation time and ultrasonic-sound exposure time were both set at 3 to 5 hours per 1,000 mL.

Subsequently, centrifugal separation was applied under relative centrifugal force of 700 G for 30 minutes to the resulting fluid composition by a centrifugal separator ("HI-MAC-CT4D", trade name; manufactured by Hitachi, Ltd.). The fluid composition subjected to the centrifugal separation was collected by a dropping pipette, and any remaining aggregates of carbon nanotubes were removed.

Example 2

A heat transport medium was produced in a similar manner as in Example 1 except that, as shown in Table 1, the content of the specific carbon nanotubes was changed to 10 wt % and the content of carboxymethylcellulose sodium was changed to 5 wt %.

Example 3

A heat transport medium was produced in a similar manner as in Example 1 except that, as shown in Table 1, the content of the specific carbon nanotubes was changed to 3.6 wt % and the content of carboxymethylcellulose sodium was changed to 4 wt %.

Comparative Example 1

Ultrapure water produced using the pure water production system ("MILLI-Q-LABO", trade name; manufactured by Nihon Millipore K.K.) was provided as a heat transport medium of Comparative Example 1.

Comparative Example 2

A heat transport medium was produced in a similar manner as in Example 1 except that, as shown in Table 1, the content of the specific carbon nanotubes was changed to 0.4 wt % and carboxymethylcellulose sodium was omitted.

Comparative Example 3

A heat transport medium was produced in a similar manner as in Example 1 except that, as shown in Table 1, the 15 wt % of the specific carbon nanotubes was changed to 10.0 wt % of "AL2O3 NANOPARTICLES" (trade name, product of Japan Aerosil Co., Ltd.; model No.: AEROXIDE-Alu-C-805) and the 10 wt % of carboxymethylcellulose sodium was changed to 4.0 wt % of sodium polycarboxylate.

Comparative Example 4

A heat transport medium was produced in a similar manner as in Example 2 except that, as shown in Table 1, the 10 wt % of the specific carbon nanotubes ("CARBERE", trade name for cup stack carbon nanotubes, product of GSI Creos Corporation; outer diameter: 100 nm, length: 10 μm) was changed to 0.9 wt % of carbon nanotubes ("MULTIWALL CARBON NANOTUBES", trade name, product of Sigma-Aldrich Corporation; model No.: 636495-50G; outer diameter: 20 to 30 nm, wall thickness: 1 to 2 nm, length: 0.5 to 2 μm, purity: 95% or more).

Comparative Example 5

A heat transport medium was produced in a similar manner as in Example 2 except that, as shown in Table 1, the 10 wt % of the specific carbon nanotubes ("CARBERE", trade name for cup stack carbon nanotubes, product of GSI Creos Corporation; outer diameter: 100 nm, length: 10 μm) was changed to 0.47 wt % of carbon nanotubes ("SINGLEWALL CARBON NANOTUBES", trade name, product of Carbon Nanotechnologies Incorporated; model No.: XB-0914).

Comparative Example 6

A heat transport medium was produced in a similar manner as in Example 2 except that, as shown in Table 1, the 10 wt % of the specific carbon nanotubes ("CARBERE", trade name for cup stack carbon nanotubes, product of GSI Creos Corporation; outer diameter: 100 nm, length: 10 μm) was changed to 0.36 wt % of carbon nanotubes ("DOUBLE-WALL CARBON NANOTUBES", trade name, product of Sigma-Aldrich Corporation; model No.: 63735-1; outer diameter: 5 nm or lower, wall thickness: 1.3 to 2.0 nm, length: 5 to 20 μm, purity: 90% or more).

Comparative Example 7

A heat transport medium was produced in a similar manner as in Example 2 except that, as shown in Table 1, the 10 wt % of the specific carbon nanotubes ("CARBERE", trade name for cup stack carbon nanotubes, product of GSI Creos Corporation; outer diameter: 100 nm, length: 10 μm) were changed to 0.93 wt % of carbon nanotubes ("SINGLE-TRIPLE MIXTURE CARBON NANOTUBES", trade name, product of Carbon Nanotechnologies Incorporated; model No.: XD-34429-A).

TABLE 1

| | Kind of carbon nanotubes | Concentration of carbon nanotubes (wt %) | Concentration of carboxymethylcellulose sodium (wt %) |
|---|---|---|---|
| Example 1 | CS-CNT | 15 | 10 |
| Example 2 | CS-CNT | 10 | 5 |
| Example 3 | CS-CNT | 3.6 | 4 |
| Comp. Ex. 1 | — | 0 | 0 |
| Comp. Ex. 2 | CS-CNT | 0.4 | 0 |
| Comp. Ex. 3 | $Al_2O_3$ nanoparticles | (10.00) | (4) |
| Comp. Ex. 4 | MWCNT | 0.9 | 5 |
| Comp. Ex. 5 | SWCNT | 0.47 | 5 |
| Comp. Ex. 6 | DWCNT | 0.36 | 5 |
| Comp. Ex. 7 | SW mixed | 0.93 | 5 |

In Table 1, CS-CNT: specific carbon nanotubes ("CARBERE", trade name for cup stack carbon nanotubes, product of GSI Creos Corporation; outer diameter: 100 nm, length: 10 μm), MWCNT: carbon nanotubes ("MULTIWALL CARBON NANOTUBES", trade name, product of Sigma-Aldrich Corporation; model No.: 636495-50G), SWCNT: carbon nanotubes ("SINGLEWALL CARBON NANOTUBES", trade name, product of Carbon Nanotechnologies Incorporated; model No.: XB-0914), DWCNT: carbon nanotubes ("DOUBLEWALL CARBON NANOTUBES", trade name, product of Sigma-Aldrich Corporation; model No.: 63735-1; outer diameter: 5 nm or lower, wall thickness: 1.3 to 2.0 nm, length: 5 to 20 μm, purity: 90% or more), and SW mixed: carbon nanotubes ("SINGLE-TRIPLE MIXTURE CARBON NANOTUBES", trade name, product of Carbon Nanotechnologies Incorporated; model No.: XD-34429-A).

2. Measurement

For the heat transport medium provided thorough above process, pH, density, specific heat, thermal diffusivity, heat conductivity and kinetic viscosity were measured and it was confirmed by a visual check whether there was deposition or not. Those results are shown in Table 2.

pH was measured with a pH meter (Handy type pH meter, Cyberscan PH310, produced by Eutech Instruments Ltd.). Density was measured with a density bottle (catalog No. 03-247, produced by Fischer Scientific Inc.). Specific heat was measured with the DSC (DSC-220C, produced by SEIKO instruments Inc.). Thermal diffusivity was measured by the TWA method with ai-Phase-akai, produced by ai-Phase Co., Ltd. and Nano flash LFA447 produced by Netzsch. Heat conductivity was measured by the following calculation:

$\lambda = \alpha * Cp * D$ $\lambda$: heat conductivity
$\alpha$: thermal diffusivity
$Cp$: specific heat
$D$: density Kinetic viscosity was measured with kinetic viscosity measuring equipment (Kinematic Viscosity Bath, produced by Tanaka Scientific Instrument Co., Ltd) and a viscometer (Uberote viscometer, 2613-0001~2613-100, produced by Shibata Scientific Technology LTD.).

Figure 5:
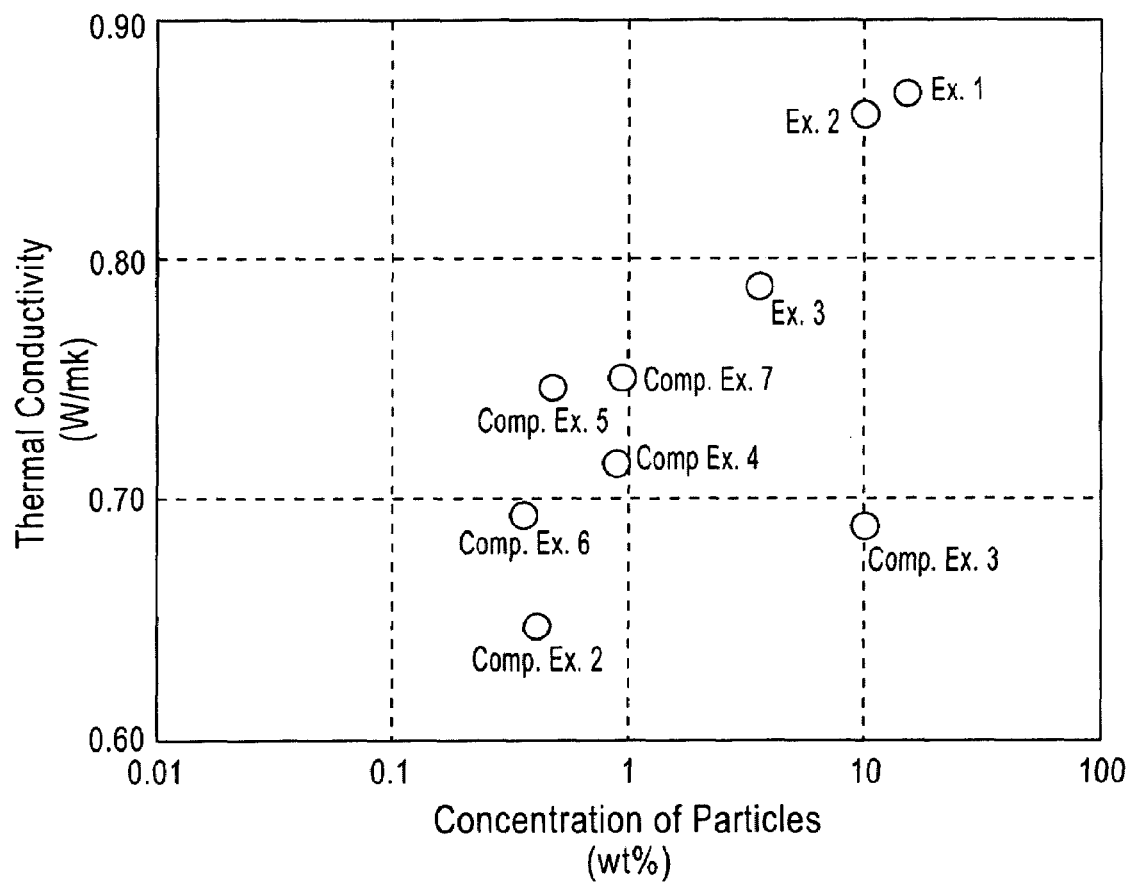
FIG. 5 is a diagram illustrating a relationship between the concentrations of particles in heat transport media and their heat conductivity.

Relationships of the thermal conductivity vs. the concentrations of the carbon nanotubes in the respective heat transport media are illustrated in FIG. 5.

TABLE 2

| | pH | Density (g/cm$^3$) | Specific heat (kJ/kgK) | thermal diffusivity (cm$^2$/sec) | Heat conductivity (W/mk) | Kinetic viscosity (mm$^2$/sec) | Precipitation |
|---|---|---|---|---|---|---|---|
| Example 1 | 7.7 | 1.09 | 4.05 | 1.97 | 0.87 | 8.97 | None |
| Example 2 | 7.8 | 1.07 | 4.10 | 1.95 | 0.86 | 6.34 | None |
| Example 3 | 7.7 | 1.07 | 4.10 | 1.79 | 0.79 | 4.03 | None |
| Comp. Ex. 1 | 6.9 | 1.00 | 4.10 | 1.44 | 0.60 | 0.68 | None |
| Comp. Ex. 2 | 7.3 | 1.00 | 4.10 | 1.56 | 0.66 | 0.75 | None |
| Comp. Ex. 3 | 8.9 | 1.10 | 4.20 | 1.52 | 0.69 | 9.42 | None |
| Comp. Ex. 4 | 7.8 | 1.05 | 4.20 | 1.66 | 0.72 | 6.22 | None |
| Comp. Ex. 5 | 7.8 | 1.05 | 4.15 | 1.71 | 0.75 | 5.58 | None |
| Comp. Ex. 6 | 7.8 | 1.05 | 4.15 | 1.58 | 0.69 | 5.69 | None |
| Comp. Ex. 7 | 7.8 | 1.05 | 4.15 | 1.71 | 0.75 | 5.87 | None |

Figure 6:
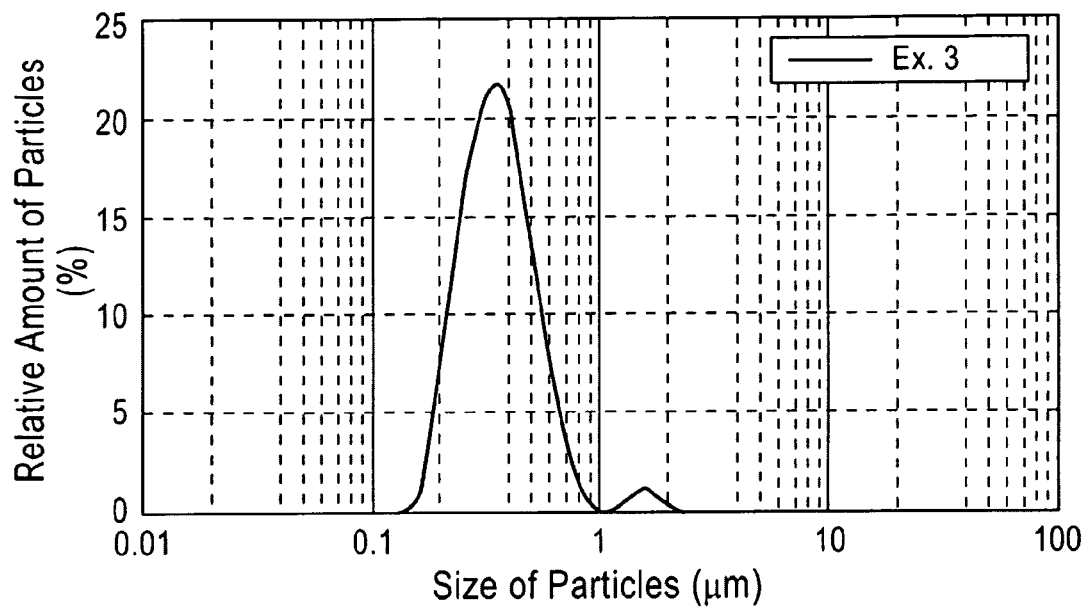
FIG. 6 is a diagram depicting a size distribution of the particles in one of the heat transport media.

With respect to the heat transport medium of Example 3, produced as described above, the particle size distribution of the specific carbon nanotubes was analyzed using a particle size distribution analyzer ("LASER DIFFRACTION PARTICLE SIZE ANALYZER SALD-2100", trade name; manufactured by Shimadzu Corporation). The results are shown in FIG. 6.

Figure 7:
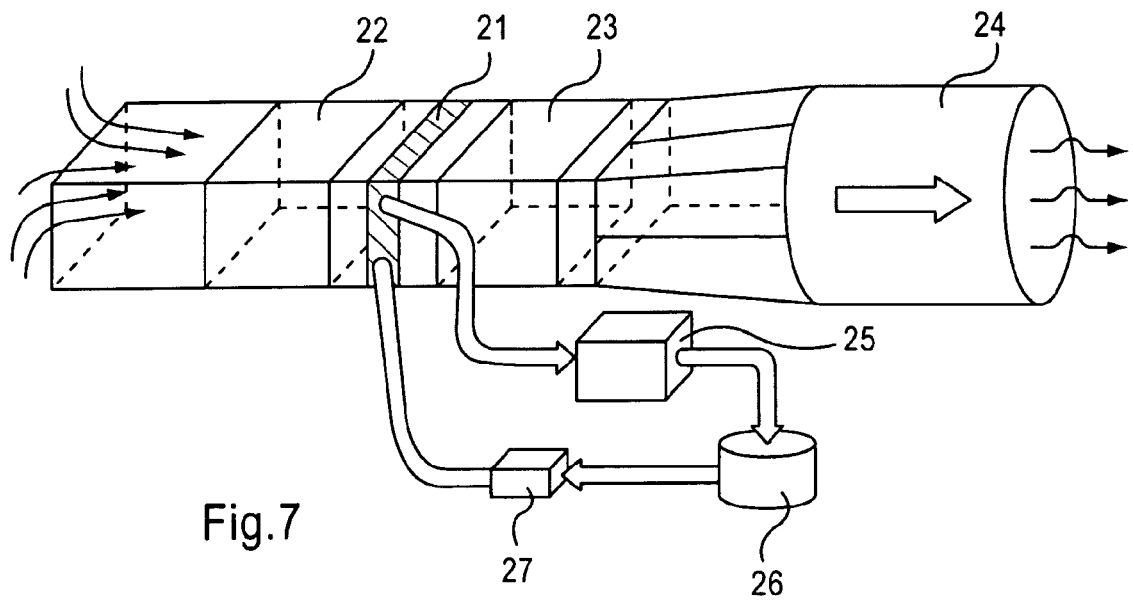
FIG. 7 is a diagram showing equipment measuring an amount of heat release for a heat transport medium.

Further, the heat transport media of Example 3 and Comparative Examples 1 and 7, produced as described above, were measured for transferred heat quantity by using a transferred-heat-quantity measuring equipment depicted in FIG. 7. The transferred-heat-quantity measuring equipment of FIG. 7 is constructed of a heat exchanger 21 (genuine component for "ACCORD", trademark; manufactured by Honda Motor Co., Ltd.), air channels 22, 23 fabricated by working on aluminum plates, thermally insulated with adiabatic sheets ("K-FLEX 25 mm ST Grade", trade name; product of L'ISOLANTE K-FLEX SRL, Italy) and equipped with straightening vanes, and a blower 24 ("JET SUIFAN SF-J-300-1", trade name; manufactured by Suiden Co., Ltd.). The air channels 22, 23 are arranged upstream and downstream of the heat exchanger 21, respectively, and the blower 24 is disposed on the downstream side of the air channel 23. Within the heat exchanger 21, cartridge heaters ("HLC1305", trade name; manufactured by Hakko Electric Machine Co., Ltd.) are fitted as many as 18 cartridges. A heating tank 25 with its surfaces thermally insulated by adiabatic sheets ("K-FLEX 25 mm ST Grade", trade name; product of L'ISOLANTE K-FLEX SRL, Italy), a circulating pump 26 ("LEVITRO PUMP LEV300", trade name; manufactured by Iwaki Co., Ltd.) and a flow meter 27 ("FD-82", trade name; manufactured by Keyence Corporation) are arranged to circulate the heat transport medium while heating the same.

Figure 8:
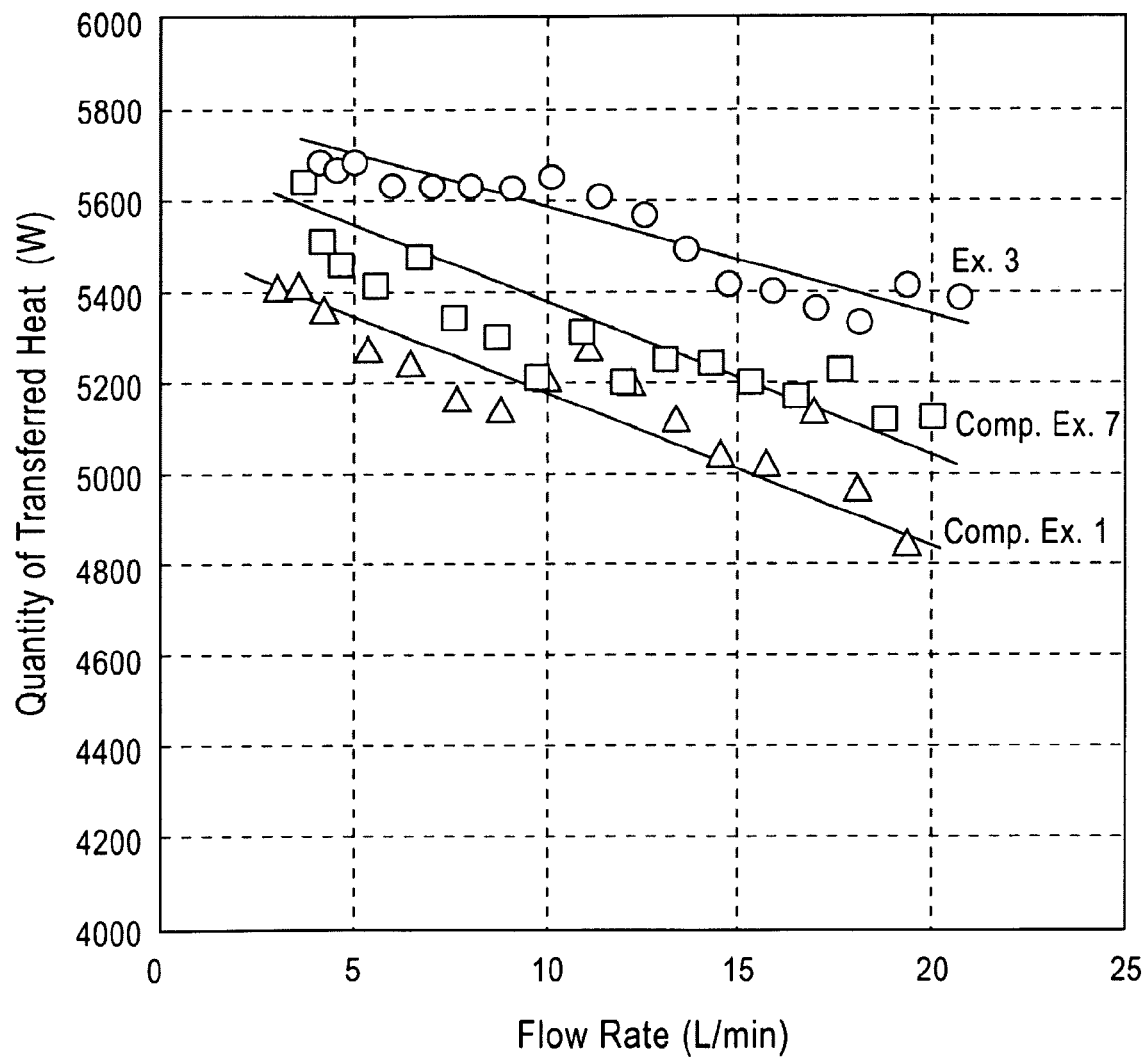
FIG. 8 is a diagram showing an amount of heat release in relation to an amount of flow rate for heat transport medium.

The amount of the heat release (Q) is calculated from $\Delta T$, Cp, D, V and the below formula. $\Delta T$ is difference between the temperature of heat transport medium inflowing the heat exchanger 21 and the temperature of transport medium outflowing the heat exchanger 21. Cp and D are the specific heat and the density of the heat transport medium respectively. V is the flow rate measured with the flow meter 27. The result of Q is shown in FIG. 8.

$$Q = \Delta T * Cp * D * V$$

From the measurement results shown in Table 2, the following have been ascertained. Firstly, a comparison between Examples 1 to 3 and Comparative Examples 1 to 2 has indicated that the heat conductivity of a base liquid is increased by dispersing the specific carbon nanotubes with a dispersant in the base liquid and that, when no dispersant is used, the specific carbon nanotubes do not disperse well in the base liquid and the heat conductivity is not improved. Secondly, a comparison between Examples 1 to 3 and Comparative Examples 2 to 7 has indicated that as illustrated in FIG. 5, the specific carbon nanotubes can be dispersed at higher concentrations than the other carbon nanotubes and can hence provide a base liquid with higher heat conductivity. It has also been indicated that the use of "AL203 NANOPARTICLES" does not significantly improve the heat conductivity although "AL203 NANOPARTICLES" can be dispersed at high concentration.

As readily appreciated from FIG. 6, it was indicated that in the heat transport medium of Example 3, the particle sizes were distributed in the range of ± approximately 0.2 μm, centering at 0.35 μm. It was also indicated that, although aggregates of approximately 1.5 μm or so were observed, their amount was not greater than one tenth of the whole amount of the particles and the specific carbon nanotubes were distributed as a whole on the order of nanometers.

As is evident from FIG. 8, it has also been indicated from a comparison in the quantity of transferred heat between the use of the heat transport medium of Example 3 and the use of the heat transport media of Comparative Examples 1 and 7 that the quantity of transferred heat pronouncedly increases when the heat transport medium of Example 3 is used.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A heat transport medium, comprising:
   a base liquid;
   carbon nanotubes; and
   a dispersant,
   wherein said carbon nanotubes are selected from the group consisting of:
   (i) a obliquely cut carbon nanotube having a oblique cut surface, said obliquely cut carbon nanotube having been obtained by cutting a cylindrical carbon nanotube obliquely and having surface functional groups formed on said oblique cut surface, and
   (i) a axially cut carbon nanotube having an axial cut surface, said axially cut carbon nanotube having been obtained by cutting a cylindrical carbon nanotube axially and having surface functional groups formed on said axial cut surface.

2. The heat transport medium according to claim 1, wherein said dispersant is carboxymethylcellulose sodium.

3. The heat transport medium according to claim 2, wherein the content of said carbon nanotubes is from 0.1 to 15 wt %, and the content of said carboxymethylcellulose sodium is from 0.1 to 10 wt %.

4. A method of cooling an internal combustion engine in a vehicle, comprising the step of:
   circulating a heat transport medium, comprising:
   a base liquid;
   carbon nanotubes; and
   a dispersant,
   wherein said carbon nanotubes are selected from the group consisting of:
   (i) a obliquely cut carbon nanotube having a oblique cut surface, said obliquely cut carbon nanotube having been obtained by cutting a cylindrical carbon nanotube obliquely and having surface functional groups formed on said oblique cut surface, and
   (i) a axially cut carbon nanotube having an axial cut surface, said axially cut carbon nanotube having been obtained by cutting a cylindrical carbon nanotube axially and having surface functional groups formed on said axial cut surface.

* * * * *